US011951908B2

(12) United States Patent
Bhaskar et al.

(10) Patent No.: US 11,951,908 B2
(45) Date of Patent: Apr. 9, 2024

(54) EXTERIOR REARVIEW MIRROR OR WINGLET FOR A VEHICLE HAVING AN ELECTRICAL DEVICE ATTACHED TO A HOUSING

(71) Applicant: Ficosa North America Corporation, Madison Heights, MI (US)

(72) Inventors: Vishal Bhaskar, Troy, MI (US); Ricardo Alberto Peña Garza, Warren, MI (US); Bruno Lescroart, Troy, MI (US); Gouthama Reddy Bondalapati, Novi, MI (US)

(73) Assignee: Ficosa North America Corporation, Madison Heights, MI (US)

( * ) Notice: Subject to any disclaimer, the term of this patent is extended or adjusted under 35 U.S.C. 154(b) by 718 days.

(21) Appl. No.: 16/942,322

(22) Filed: Jul. 29, 2020

(65) Prior Publication Data

US 2021/0031694 A1 Feb. 4, 2021

Related U.S. Application Data

(60) Provisional application No. 62/881,103, filed on Jul. 31, 2019.

(51) Int. Cl.
*B60R 1/06* (2006.01)
*B60Q 1/00* (2006.01)
(Continued)

(52) U.S. Cl.
CPC .............. *B60R 1/06* (2013.01); *B60Q 1/0088* (2013.01); *B60Q 1/2661* (2013.01);
(Continued)

(58) Field of Classification Search
CPC .. B60R 1/06; B60R 1/02; B60R 1/072; B60R 1/1207; B60R 11/04; B60R 2001/1253;
(Continued)

(56) References Cited

U.S. PATENT DOCUMENTS 6,310,738 B1 * 10/2001 Chu ......................... B60R 1/06
359/872
6,347,872 B1 * 2/2002 Brechbill .................. B60R 1/06
359/838

(Continued)

OTHER PUBLICATIONS

Non-Final Office Action for U.S. Appl. No. 16/942,294, filed Jul. 29, 2020; dated Apr. 28, 2021, 15 pgs.

*Primary Examiner* — Nkeisha Smith
(74) *Attorney, Agent, or Firm* — Brooks Kushman P.C.

(57) ABSTRACT

In at least one embodiment, an exterior rearview winglet assembly for a vehicle is provided. The assembly includes an exterior shell, a base bracket, a first housing, a finisher, and a first electrical device. The exterior shell includes a first side orientated toward a front of the vehicle and a second side orientated toward a rear of the vehicle. The base bracket is positioned in the exterior shell to couple the exterior shell to the vehicle. The first housing is positioned in the exterior shell. The finisher is being attached to the first housing and extending from at least a portion of the exterior shell at the second side of the exterior shell. The first electrical device is directly attached to the first housing and the first electrical device is independent of attachment to the finisher.

19 Claims, 15 Drawing Sheets

(51) Int. Cl.
  *B60Q 1/26* (2006.01)
  *B60R 1/02* (2006.01)
  *B60R 1/072* (2006.01)
  *B60R 1/12* (2006.01)
  *B60R 11/04* (2006.01)
  *F21S 43/20* (2018.01)
  *F21S 43/27* (2018.01)
  *B60R 11/00* (2006.01)

(52) U.S. Cl.
  CPC .............. *B60Q 1/2665* (2013.01); *B60R 1/02* (2013.01); *B60R 1/072* (2013.01); *B60R 1/1207* (2013.01); *B60R 11/04* (2013.01); *F21S 43/26* (2018.01); *F21S 43/27* (2018.01); *B60R 2001/1253* (2013.01); *B60R 2011/004* (2013.01)

(58) Field of Classification Search
  CPC ..... B60R 2011/004; B62J 29/00; F21S 43/27; F21S 43/26; B60Q 1/0088; B60Q 1/2661; B60Q 1/2665
  See application file for complete search history.

(56) References Cited

U.S. PATENT DOCUMENTS

| | | | |
|---|---|---|---|
| 6,382,805 B1* | 5/2002 | Miyabukuro | B60R 1/06 359/872 |
| 6,582,109 B2* | 6/2003 | Miller | B60Q 1/2665 362/135 |
| 6,712,329 B2* | 3/2004 | Ishigami | B60R 1/06 248/475.1 |
| 7,306,355 B2* | 12/2007 | Walser | B60Q 1/2665 362/540 |
| 7,334,922 B2* | 2/2008 | Bonardi | B60R 1/07 362/540 |
| 7,815,325 B2 | 10/2010 | Shinohara | |
| 8,678,627 B2* | 3/2014 | Serve | B29C 45/1679 362/494 |
| 10,493,906 B2* | 12/2019 | Favero | B60Q 1/263 |
| 10,814,787 B2* | 10/2020 | Felix | A01M 29/26 |
| 10,836,317 B2* | 11/2020 | Wang | B60R 1/06 |
| 10,953,788 B2* | 3/2021 | Kastanis | B60Q 1/2665 |
| 11,027,658 B2* | 6/2021 | Kim | F21S 43/27 |
| 11,325,534 B2* | 5/2022 | Lettis | B60R 1/1207 |
| 2005/0254153 A1 | 11/2005 | Kawanishi | |
| 2011/0051450 A1 | 3/2011 | Murata | |
| 2011/0170307 A1 | 7/2011 | Ishikawa et al. | |
| 2011/0205649 A1 | 8/2011 | Suzuki | |
| 2011/0205747 A1 | 8/2011 | Suzuki et al. | |
| 2012/0081915 A1 | 4/2012 | Foote et al. | |
| 2012/0113660 A1 | 5/2012 | Ishikawa et al. | |
| 2013/0242586 A1 | 9/2013 | Huizen et al. | |
| 2018/0001823 A1* | 1/2018 | Bhaskar | B60R 1/08 |
| 2018/0072232 A1* | 3/2018 | Negel | F21S 43/245 |
| 2018/0079355 A1 | 3/2018 | Muegge | |
| 2018/0124878 A1* | 5/2018 | Fritz | H05B 1/0236 |
| 2018/0186292 A1 | 7/2018 | Hamlin et al. | |
| 2018/0345865 A1* | 12/2018 | Maxwell | B60R 1/12 |
| 2021/0402926 A1* | 12/2021 | Lettis | B60R 1/1207 |

\* cited by examiner

EXTERIOR REARVIEW MIRROR OR WINGLET FOR A VEHICLE HAVING AN ELECTRICAL DEVICE ATTACHED TO A HOUSING

CROSS-REFERENCE TO RELATED APPLICATIONS

This application claims the benefit of U.S. provisional application Ser. No. 62/881,103 filed Jul. 31, 2019, the disclosure of which is hereby incorporated in its entirety by reference herein.

TECHNICAL FIELD

Aspects disclosed herein generally relate to an exterior rearview mirror or winglet for a vehicle. Numerous aspects related to the exterior rearview mirror or winglet will be discussed in more detail below. In one aspect, an exterior rearview winglet assembly for a vehicle is disclosed that includes an exterior shell, a base bracket, a first housing, a finisher, and a first electrical device. The first electrical device is directly attached to the first housing and the first electrical device is independent of attachment to the finisher to reduce an overall weight of the finisher.

BACKGROUND

Passenger vehicles, such as a car, sports utility vehicle, van, crossover, pickup truck or the like, typically include sideview winglets, also known as outside rearview mirrors or external side mirrors. External side mirrors are typically mounted outside the vehicle cabin to allow the driver to see the environment to the side and behind the vehicle. These mirrors can be foldable or pivotable relative to the remainder of the vehicle. The mirrors can be folded inward when, for example, the vehicle is parked to protect the mirrors from accidental collision or impact from other vehicles or objects.

SUMMARY

In one aspect, electrical devices may be directly attached to a mirror housing (or a rear portion of the mirror housing).

In at least one embodiment, an exterior rearview winglet assembly for a vehicle is provided. The assembly includes an exterior shell, a base bracket, a first housing, a finisher, and a first electrical device. The exterior shell includes a first side oriented toward a front of the vehicle and a second side oriented toward a rear of the vehicle. The base bracket is positioned in the exterior shell to couple the exterior shell to the vehicle. The first housing is positioned in the exterior shell. The finisher is being attached to the first housing and extending from at least a portion of the exterior shell at the second side of the exterior shell. The first electrical device is directly attached to the first housing and the first electrical device is independent of attachment to the finisher.

In at least one embodiment, an exterior rearview winglet assembly for a vehicle is provided. The assembly includes an exterior shell, a base bracket, a first housing, a finisher, and a first electrical device. The exterior shell includes a first side oriented toward a front of the vehicle and a second side oriented toward a rear of the vehicle. The base bracket couples the exterior shell to the vehicle. The first housing is positioned in the exterior shell. The finisher is attached to the first housing and extends from at least a portion of the exterior shell at the second side of the exterior shell. The first electrical device is directly attached to the first housing and the first electrical device is independent of attachment to the finisher to reduce an overall weight of the finisher.

In at least one embodiment, an exterior rearview winglet assembly for a vehicle is provided. The assembly includes an exterior shell, a base bracket, a first housing, a finisher, and a first electrical device. The exterior shell includes a first side oriented toward a front of the vehicle and a second side oriented toward a rear of the vehicle. The base bracket couples the exterior shell to the vehicle. The first housing is positioned in the exterior shell. The finisher is attached to the first housing and extends from at least a portion of the exterior shell at the second side of the exterior shell. The first electrical device is directly attached to the first housing and the first electrical device being independent of attachment to the finisher to prevent the finisher from decoupling from the exterior shell.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 5 generally depicts a cross sectional view of the lighting lens and the mirror housing of FIG. 3;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms as noted herein (e.g., "upper", "lower", "inner", "outer", "top", "bottom", etc.) simply refer to the orientation of various components as illustrated in the accompanying figures and the manner in which the exterior rearview mirror may be oriented relative to the vehicle. Such terms are provided for context and understanding of the embodiments disclosed herein.

Figure 1:
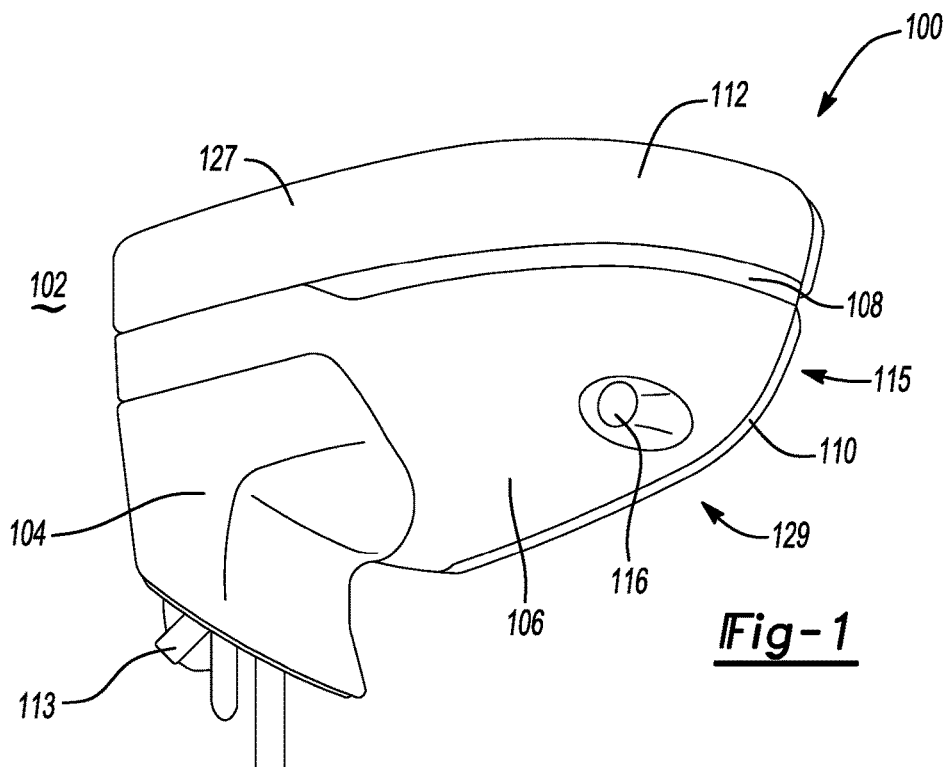
FIG. 1 generally depicts a perspective view of an exterior rearview mirror for a vehicle in accordance to one embodiment.

FIG. 1 generally depicts a perspective view of an exterior rearview winglet assembly 100 (hereafter "assembly") for a vehicle 102 in accordance to one embodiment. It is recognized that the vehicle 102 may be a passenger car, van, truck, sports utility vehicle (SUV), etc. It is further recognized that the aspects disclosed herein in connection with the assembly 100 may be incorporated or implemented on an exterior winglet as mounted on the vehicle 102. The assembly 100 may be implemented as a rearview mirror assembly that is generally arranged to pivot or swivel about the vehicle 102 to enable a driver or vehicle occupant to position a reflective surface (e.g., mirror, etc.) (not shown) on the assembly 100 at an optimum position such that the driver can have a field of view ("FOV") rearward and to the side of the vehicle 102 to view other vehicles or objects accordingly. The assembly 100 may include an image capture device (e.g., a camera, image recording device, etc.) (not shown), as opposed to the reflective surface, to capture images of vehicles or objects to the rear and to the side of the vehicle 102. The image capture device may provide captured images to the display located in the vehicle 102 (e.g., display positioned on a door, display positioned on an instrument panel, display positioned on A or B pillar of vehicle 102, etc.).

The assembly 100 generally includes a base cover 104, a finisher 106, a cap (or skull cap) 112 that are formed together to form an exterior shell 115 for the assembly 100. The assembly 100 further includes a base bracket 113. The relevance of the base bracket 113 will be discussed in more detail in connection with FIG. 13 below. A lighting lens cover 108 is positioned between the finisher 106 and the skull cap 112. It is recognized that the lighting lens cover 108 may be fully transparent (e.g., clear) or semi-transparent (e.g., frosted), etc. The lighting lens cover 108 generally includes a light pipe (or other illumination device) that generally provides a visual indicator to surrounding vehicles to the vehicle 102. The visual indication as illuminated via the lens cover 108 generally coincides with turn blinkers/signals as the driver initiates his/her blinkers to change lane or turn the vehicle 102. The assembly 100 generally includes at least one image capture device 116 (hereafter "the image capture device") that is also positioned about an opening 118 of the mirror housing 123 (see FIG. 11) for capturing images exterior to the vehicle 102. Electrical wiring and connectors 114 are provided that electrically couple the image capture device, the illumination device, and one or more puddle lamps (not shown) on the assembly 100 to other components of the vehicle 102.

Figure 2:
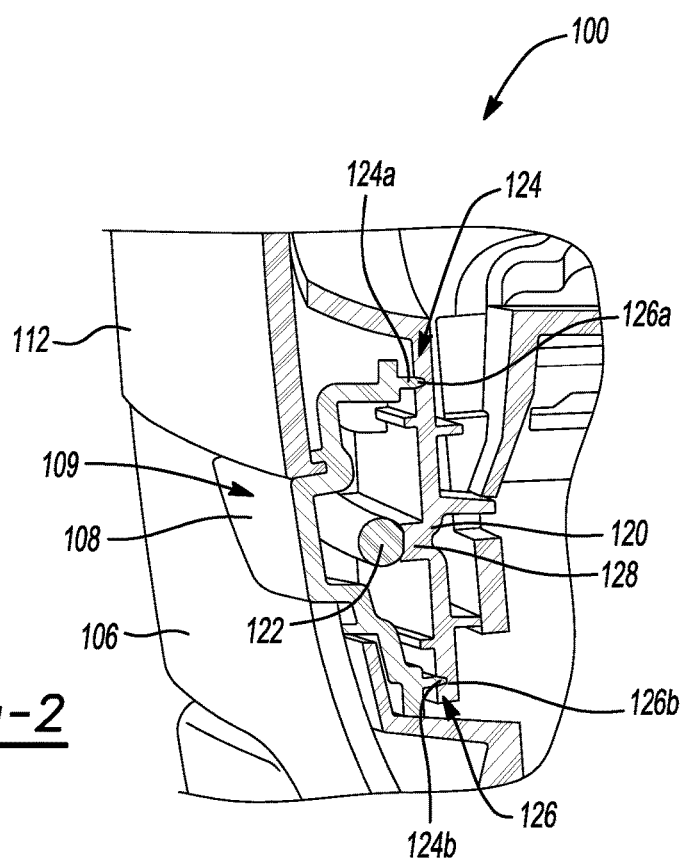
FIG. 2 generally depicts a cross sectional view of the exterior rearview mirror in accordance to one embodiment.

FIG. 2 generally depicts a cross sectional view of the exterior rearview winglet assembly 100 in accordance to one embodiment. The assembly 100 further includes a turn signal housing 120, an illumination device 122, and a mirror housing 123. As noted above, the illumination device 122 provides a visual indicator to surrounding vehicle to the vehicle 102 via the lighting lens cover 108. The illumination device 122 is generally positioned between the lens cover 108 and the housing 120. A first attachment mechanism 124 is provided that couples an upper portion of the lens cover 108 to a corresponding upper portion of the housing 120. In addition, a second attachment portion 126 is provided that couples a lower portion of the lens cover 108 to a respective corresponding lower portion of the housing 120. The first attachment portion 124 generally includes at least one extending (or male) (hereafter "extending portion") 124a and at least one receiving portion (or female) (hereafter "receiving portion") 126a. A second attachment mechanism 126 is provided that couples a lower portion of the lighting lens cover 108 to a corresponding lower portion of the housing 120. The second attachment portion 126 includes at least one extending portion 124b and at least one receiving portion 126b. As shown, the receiving portions 126a, 126b receive the extending portions 124a, 124b, respectively for coupling the lighting lens cover 108 to the housing 120. It is recognized that in other embodiments the extending portions 124a, 124b may be positioned on the housing 120 and that the receiving portions 126a, 126b may be positioned on the lighting lens cover 108 to directly couple the lighting lens cover 108 to the housing 120. Once the lighting lens cover 108 is coupled to the housing 120 via the first attachment portion 124 and the second attachment portion 126, the lighting lens cover 108 may be vibration welded to the housing 120 at the first and second attachment portions 124, 126.

By fixing or directly coupled the lighting lens cover 108 to the housing 120 that is embedded within the assembly 100, this aspect provides greater control over any gap formed between the lighting lens cover 108 and the skull cap 112 and further between the lighting lens cover 108 and the finisher 106. It is recognized that external portions of the assembly 100 are characterized as class A surfaces with respect to various OEM requirements. Thus, such surfaces are required to meet stringent requirements with respect to fit and finish as they are readily viewable to the driver and passengers in the vehicle 102.

The housing 120 further includes a protruding channel 128 to receive the illumination device 122. The illumination device 122 is generally coupled to the housing 120 via a clip and hook connection. While FIG. 2 illustrates that the extending portions 124a, 124b are positioned on the lighting lens cover 108 and that the receiving portions 126a, 126b are positioned on the housing 120, it is recognized that the extending portions 124a, 124b may alternatively be positioned on the housing 120 and that the receiving portions 126a, 126b may be positioned on the lighting lens cover 108 to couple the lighting lens cover 108 to the housing 120.

Alternatively, one extending portion 124a or 124b may be positioned on lighting lens cover 108 and the other extending portion 124b or 124a may be positioned on the housing 120. In this configuration, one receiving portion 126a or 126b may be positioned on the housing 120 and the other receiving portion 126b or 126a may be positioned on the lighting lens cover 108.

Figure 3:
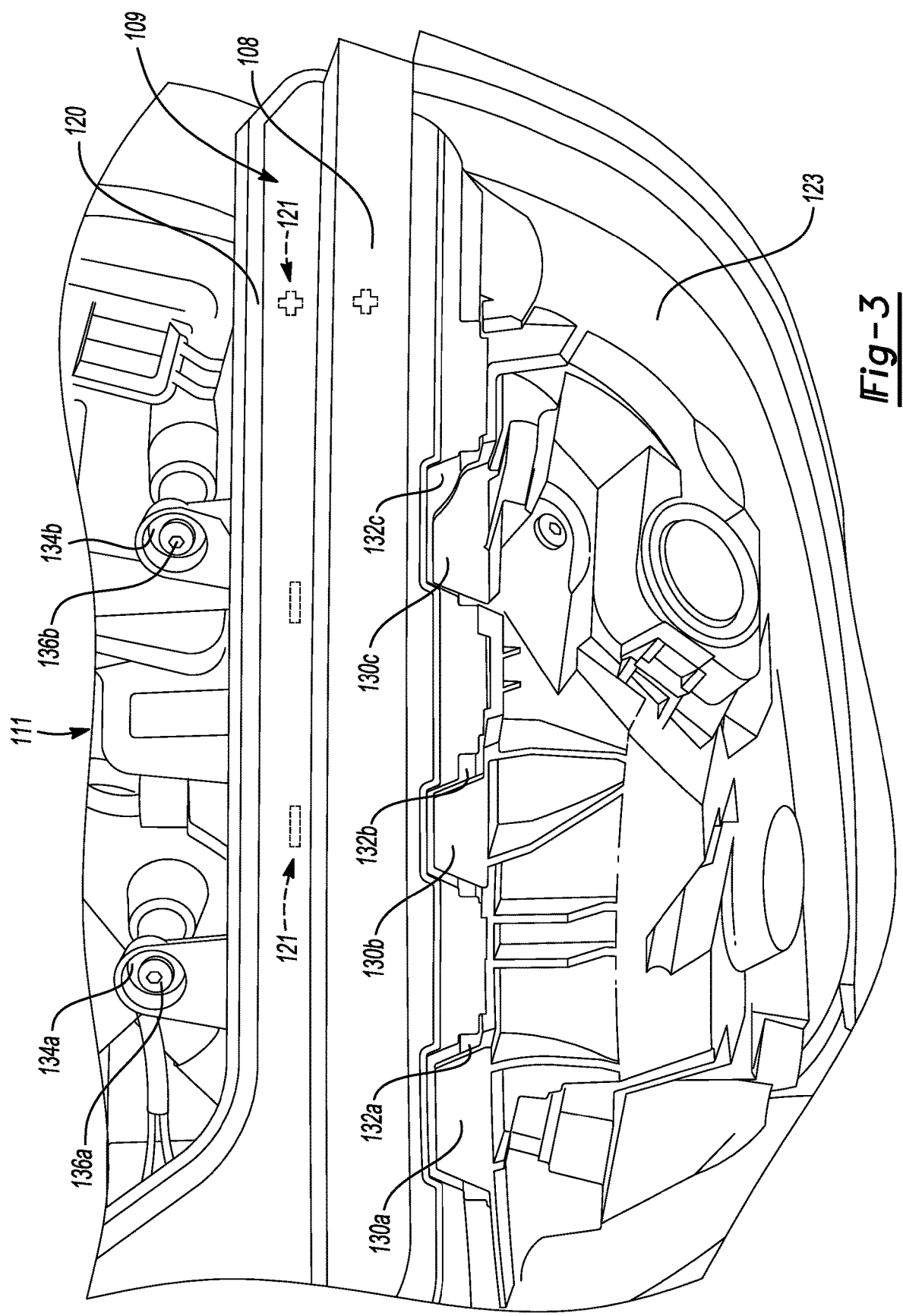
FIG. 3 generally depicts a perspective view of a lighting lens cover and a portion of a mirror housing in accordance to embodiment.

FIG. 3 generally depicts a perspective view of a lighting lens cover 108 and a portion of a mirror housing 123 in accordance to one embodiment. The mirror housing 123 generally includes a plurality of receiving ribs 130a, 130b, 130c that extend outwardly away from the mirror housing 123 and toward the finisher 106. The lighting lens cover 108 is part of a lighting lens assembly 109 that generally includes a plurality of receiving grooves 132a, 132b, 132c. The plurality of receiving ribs 130a, 130b, and 130c receive the plurality of receiving grooves 132a, 132b, 132c, respectively such that the mirror housing 123 retains the lighting lens cover 108 to the mirror housing 123 and also to the turn signal housing 120. Each rib 130a, 130b, 130c generally defines a channel for receiving the corresponding receiving groove 132a, 132b, 132c. At least one locking tab 121 (or extending tabs) positioned on an inner surface of the turn signal housing 120 to couple the lighting lens assembly 109 to the mirror housing 123. In the example illustrated in FIG. 3, four locking tabs 121 are provided to couple the inner surface of the turn signal housing 120 to the mirror housing 123. It is recognized that the mirror housing 123 includes at least one groove (not shown) to receive and mate via interference fit with the at least one locking tab 121 to secure the lighting lens assembly 109 to the mirror housing 123. At least one latching mechanism 111 is positioned between the attachment points 134a and 134b. The at least one latching mechanism 111 is generally formed as a latch or hook that fits over an extending portion (not shown) positioned on the mirror housing 123. The latching mechanism 111 latches with the extending portion to aid in attaching the lighting lens assembly 109 to the mirror housing 123. Each receiving rib 130a, 130b, 130c receives a corresponding receiving groove 132a, 132b, 132c, respectively, prior to the at least one locking tab 121 being coupled to grooves (not shown) in the mirror housing 123 to couple the lighting lens assembly 109 to the mirror housing 123.

Figure 4:
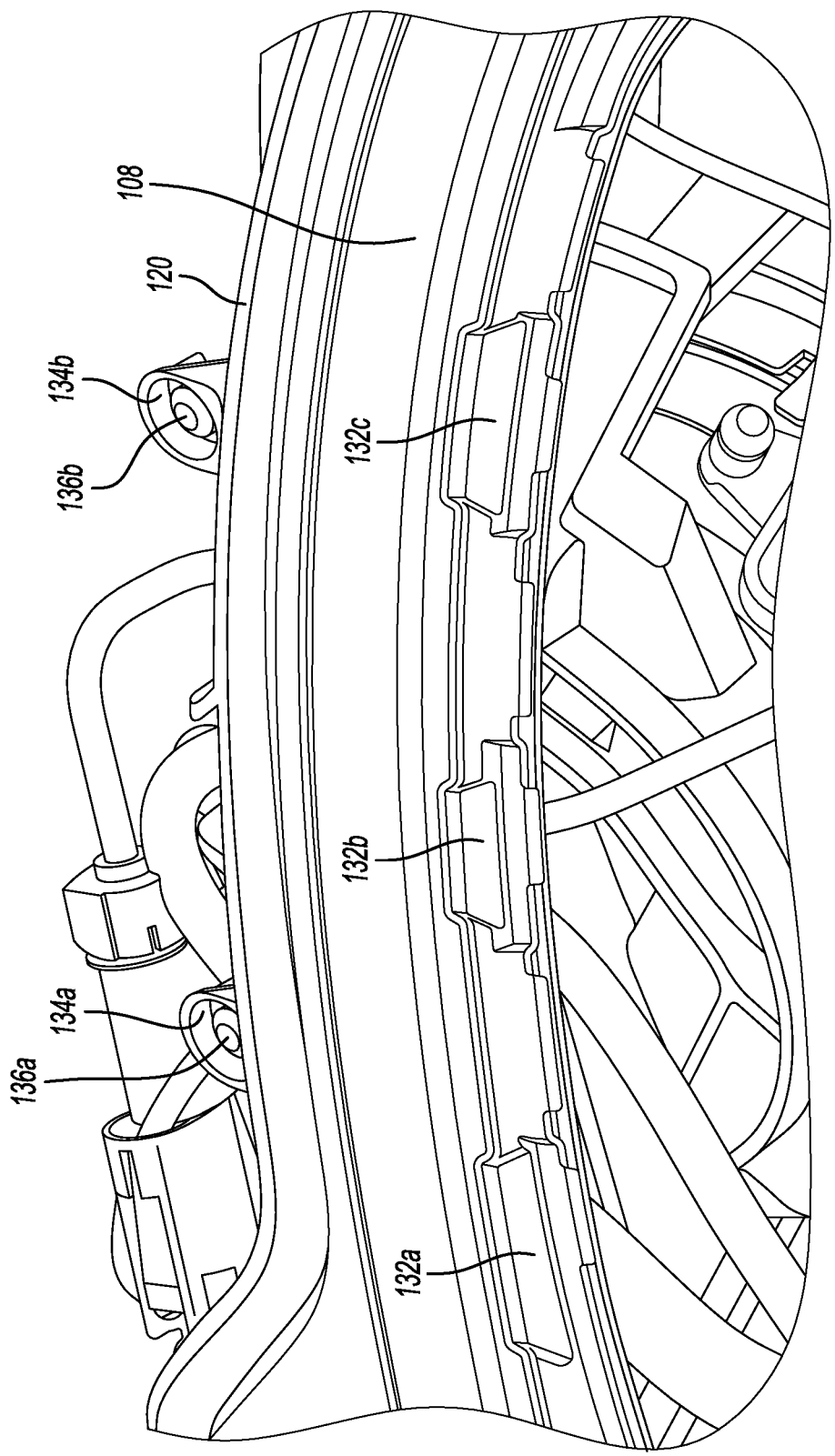
FIG. 4 generally depicts another perspective view of the lighting lens of FIG. 3.

FIG. 4 depicts a more detailed view of the plurality of receiving grooves 132a, 132b, 132c. The turn signal housing 120 includes a plurality of attachment points 134a, 134b for coupling to an upper portion of the mirror housing 123 (this is also shown in FIG. 3). In particular, the mirror housing 123 includes a plurality of clips 136a, 136b that engage the plurality of attachment points 134a, 134b to couple the mirror housing 123 to the turn signal housing 120. In reference to FIGS. 2-4, the assembly 100 includes a lighting lens assembly 109 having the lighting lens cover 108, the illumination device 122, and the turn signal housing 120.

FIGS. 1-4 generally depicts the exterior rearview assembly 100 for the vehicle 102. The assembly 100 includes the exterior shell 115, the base bracket 113, the lighting lens assembly 109, and the mirror housing 123 (e.g., the first housing). The exterior shell 115 includes a rear side 127 oriented toward a front of the vehicle 102 and a front side 129 oriented toward a rear of the vehicle 102. The base bracket 113 is coupled to the exterior shell 115 to the vehicle 102. The lighting lens assembly 109 is positioned on the exterior shell 115 and includes the illumination device 122 to illuminate about at least a side of the vehicle 102. The first housing 123 is positioned in the exterior shell 115 to directly attach the lighting lens assembly 109 thereto for coupling the lighting lens assembly 109 to the rear side 127 of the exterior shell 115. The first housing 123 is generally arranged to support a reflective surface in the exterior shell 115 when the assembly 100 is implemented as a rearview mirror assembly 100.

FIG. 5 generally depicts a cross sectional view of the lighting lens cover 108 and the mirror housing 123 of FIG. 3. The turn signal housing 120 and the mirror housing 123 generally define a gap 138 to enable each corresponding rib 130a, 130b, 130c of the mirror housing 123 to receive the groove 132a, 132b, 132c, respectively.

Figure 6:
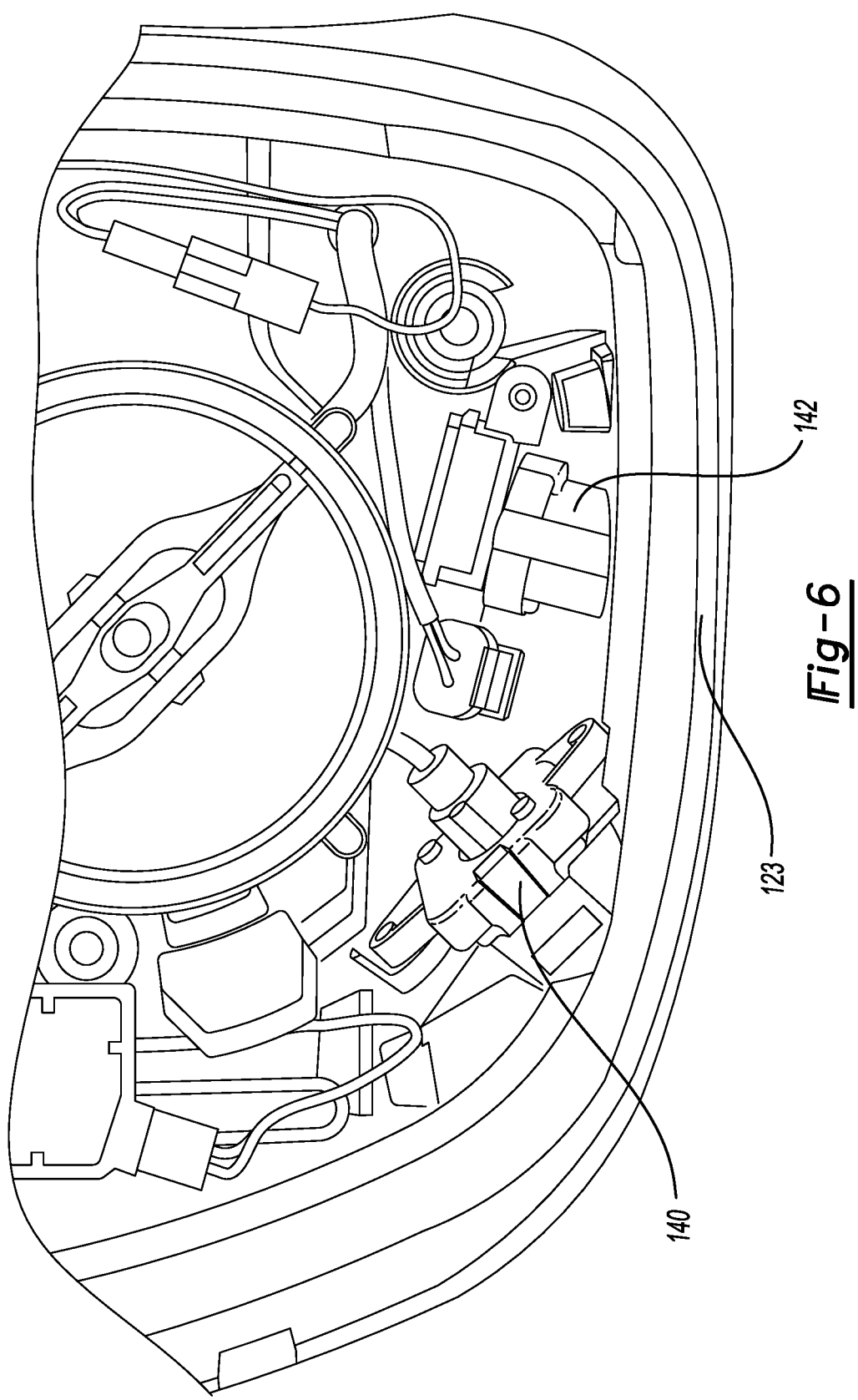
FIG. 6 generally depicts a perspective view of an interior of the mirror housing along with electrical devices in accordance to one embodiment.

FIG. 6 generally depicts a perspective view of an interior of the mirror housing 123 along with electrical devices 140 and 142 in accordance to one embodiment. In one example, the electrical device 140 may correspond to the image capture device 116. Additionally, in one example, the electrical device 142 may correspond to a lamp 144 (see FIG. 7), such as for example, a puddle lamp. The image capture device 116 and the lamp 144 are positioned on another side of the mirror housing 123 (see FIG. 7). It is recognized that the electrical device 140 or 142 may be implemented as, but not limited to, a temperature sensor, antenna, communication module, blind spot detector sensor, proximity sensor, etc. For example, FIG. 7 generally depicts a perspective underside view of the mirror housing 123 of FIG. 6. As shown, the image capture device 116 and the lamp 144 are positioned below the receiving ribs 130a, 130b, 130c of the mirror housing 123.

Figure 7:
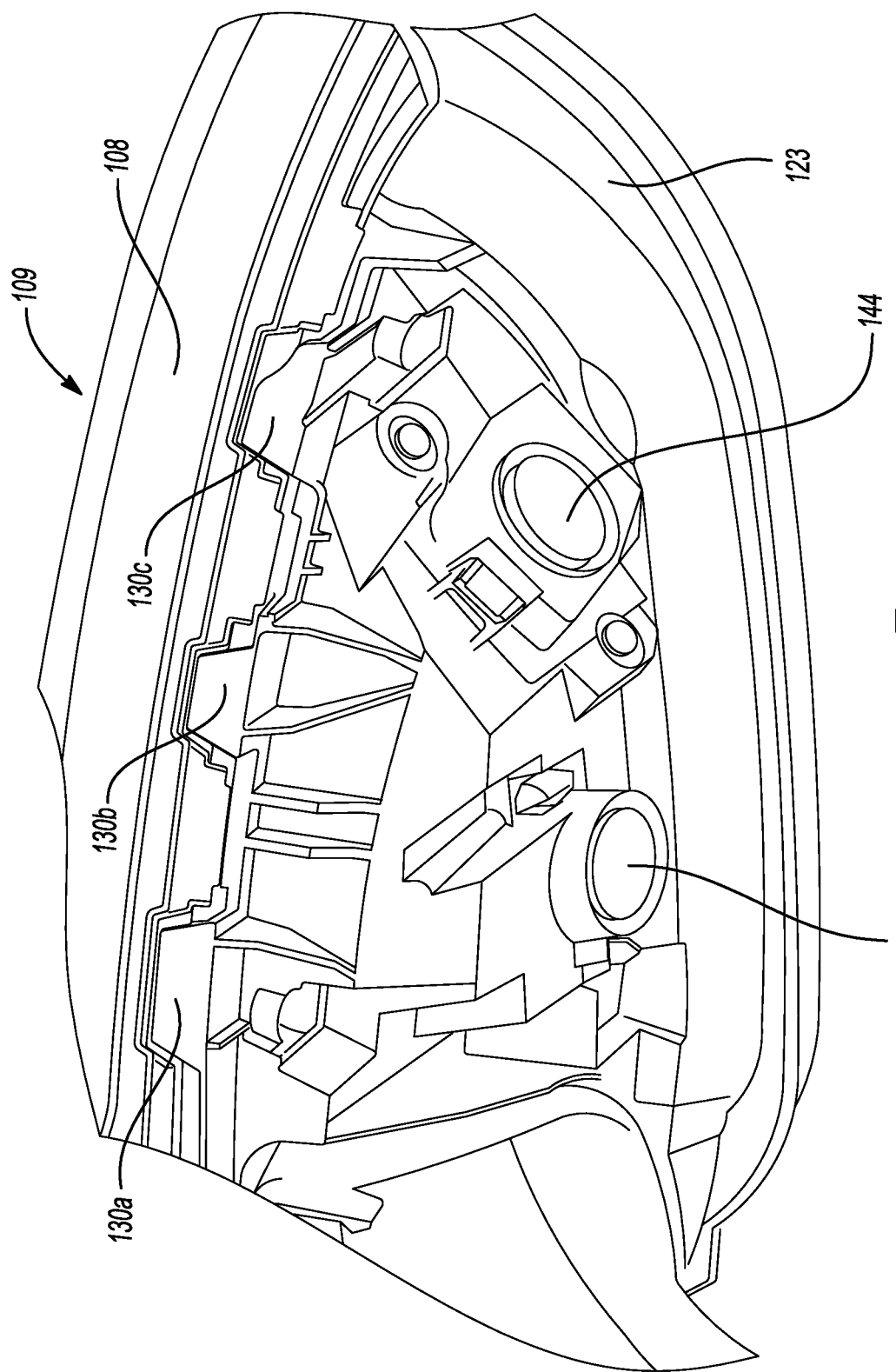
FIG. 7 generally depicts a perspective underside view of the mirror housing of FIG. 6.

Prior implementations provided for the electrical devices for the image capture device 116 and the lamp 144 to be directly coupled to the finisher 106. However, the implementations as set forth in FIG. 7 depicts that the image capture device 116 and the lamp 144 are directly coupled and fixed to the mirror housing 123 prior to the installation of the finisher 106 to the mirror housing 123. Such an implementation may be advantageous since the installation of the finisher 106 to the mirror housing 123 is simplified. For example, the finisher 106 no longer requires electrical pigtails (i.e., wiring harnesses) that need to be coupled to the mirror housing 123 during the installation of the finisher 106 to the mirror housing 123.

In addition, the removal of the wire harnesses or pigtails from the finisher 106 removes weight from the finisher and improves overall quality. For example, the additional weight provided by the electrical devices 140, 142 and wiring harness if assembled directly to the finisher 106 may cause the finisher 106 to fall from the assembly 100 and decrease quality. In this case, the overall weight of the finisher 106 co-acts with gravity to cause the finisher 106 to decouple itself from the mirror housing 123. However, if the additional weight attributed to the wire harnesses and the devices 140, 142 are not part of the finisher 106, which overall is a part that does not weight much, then quality may be improved and a reduction in the number of finishers that decouple from the assembly 100 may be achieved. In general, the finisher 106 may be removed (i.e., unclipped) from the mirror housing 123 while the electrical devices 140, 142 remain coupled to the mirror housing 123.

Figure 8:
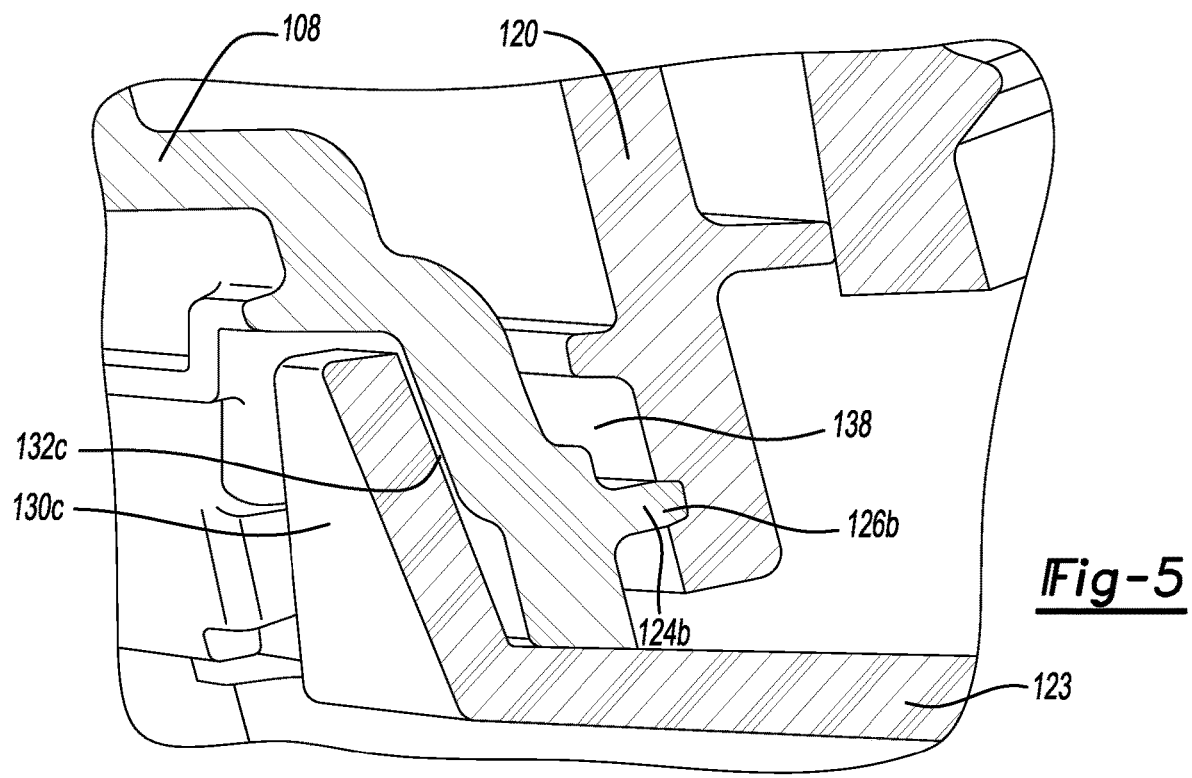
FIG. 8 generally depicts a perspective view of a finisher with openings for the electrical devices of FIG. 6.
Figure 8:
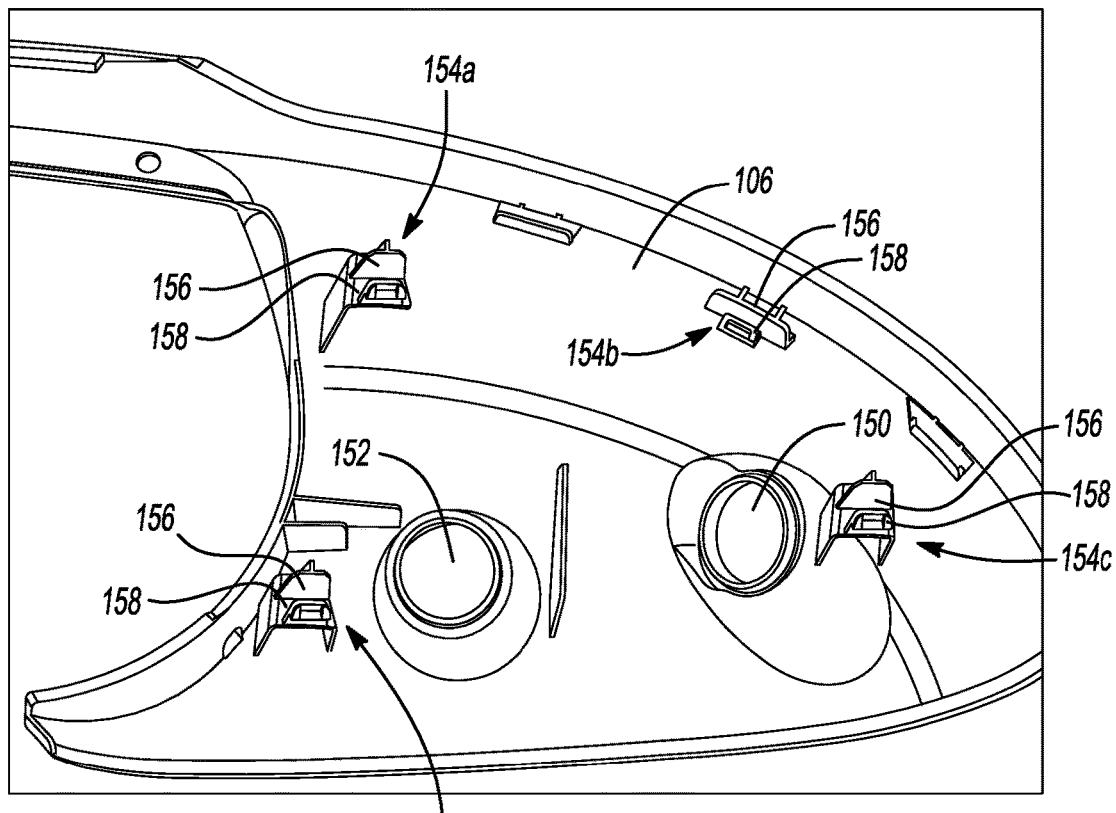

FIG. 8 generally depicts a perspective view of the finisher 106 with openings for the electrical devices 140, 142 of FIG. 6. The finisher 106 includes a first opening 150 to receive the image capture device 116 and a second opening 152 to receive the lamp 144, or vice versa. Each of the image capture device 116 and the lamp 144 is not directly attached to the finisher 106 but rather to the mirror housing 123 as noted above. The finisher 106 includes attachment points 154a, 154b, 154c, and 154d ("154") to attach the finisher 106 to the mirror housing 123. In general, each attachment point 154 includes a guide 156 and a clip 158. The guide 156 and the clip 158 may be axially spaced apart from one another (or parallel to one another). In another embodiment, the guide 156 and the clip 158 may be spaced apart from one another but not necessarily axially spaced apart from one another (or not parallel to one another). Each guide 156 serves to positively locate the finisher 106 to the mirror housing 123 as a user inserts the finisher 106 to the mirror housing 123. In some embodiments, the guide 156 may generally be in the form of a "T-shape". As seen in FIG. 8, some of the guides 156 may not have a T-shaped structure and may simply be shaped as a straight edge. Each clip 158 generally flexes upon insertion into a mating opening of the mirror housing 123 and locks to the mirror housing 123.

Figure 9:
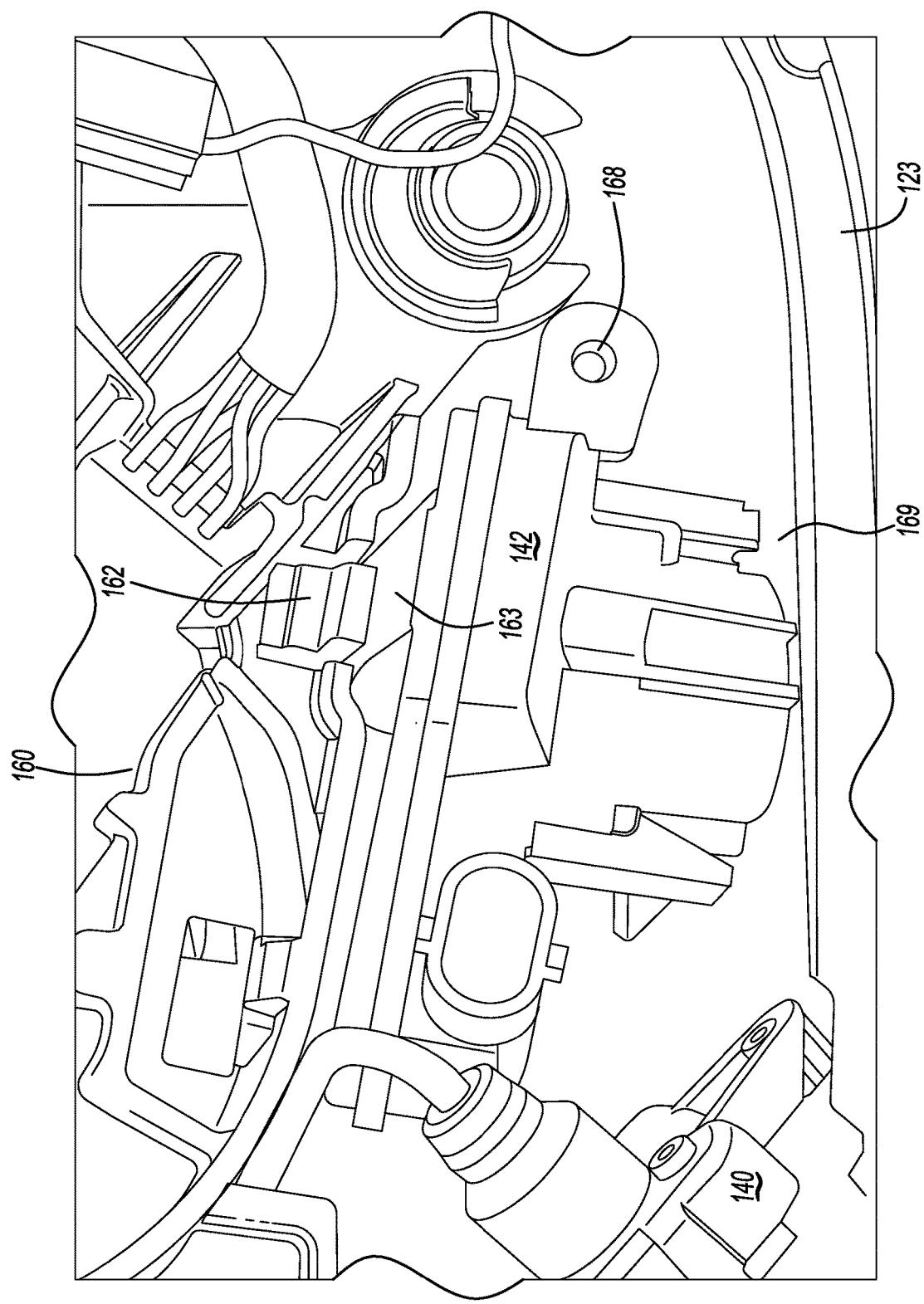
FIG. 9 generally depicts a perspective view of a connector for a lamp being mounted to the mirror housing in accordance to one embodiment.

FIG. 9 generally depicts a perspective view of the device 142 for the lamp 144 being mounted to the mirror housing 123 in accordance to one embodiment. The assembly 100 generally includes a housing bracket 160 having a portion that is positioned above the device 142 for the lamp 144. The housing bracket 160 generally provides structural support or stability for a head of the mirror (or reflective surface). In general, all of the mirror head components may be mounted or connected to housing bracket 160. The housing bracket 160 includes a flexible latch 162. The flexible latch 162 applies a force against a rear portion 163 of the electrical device 142 to secure the electrical device 142 to the mirror housing 123. The electrical device 142 includes at least one clip (hereafter "the clip") 164 and a hook and locator mechanism 166 for insertion into the mirror housing 123.

In general, the user inserts an upper portion of the rear portion 163 underneath the flexible latch 162 and then inserts the clip 164 into an opening 170 (see FIG. 10) and the hook and locator mechanism 166 into opening 172 (see FIG. 10) on the bottom floor 169 of the mirror housing 123. The flexible latch 162 moves upward and then over the rear portion 163 and applies a clamping force against the rear portion 163 once the clip 164 and the hook and locator mechanism 166 of the device 142 are fully inserted and locked with the mirror housing 123. In another embodiment, the lamp 144 may be coupled to the mirror housing 123 first. After this operation is performed, the housing bracket 160 may be coupled to the mirror housing 123 in which the flexible latch 162 is placed over the rear portion 163 to retain the lamp 144 to the assembly 100. The electrical device 142 also includes an opening 168 formed thereon to receive a fastening mechanism (not shown) to act as a secondary mechanism to secure the device 142 to the mirror housing 123. In general, the use of the opening 168 to receive the fastening mechanism is optional and is generally not required. The utilization of the flexible latch 162 that applies a clamping force on the device 142 generally negates the use of any fastening mechanism and thereby prevents the assembly 100 from experiencing and rattles therein since fasteners will not be required to secure the device 142 within the assembly 100.

Figure 10:
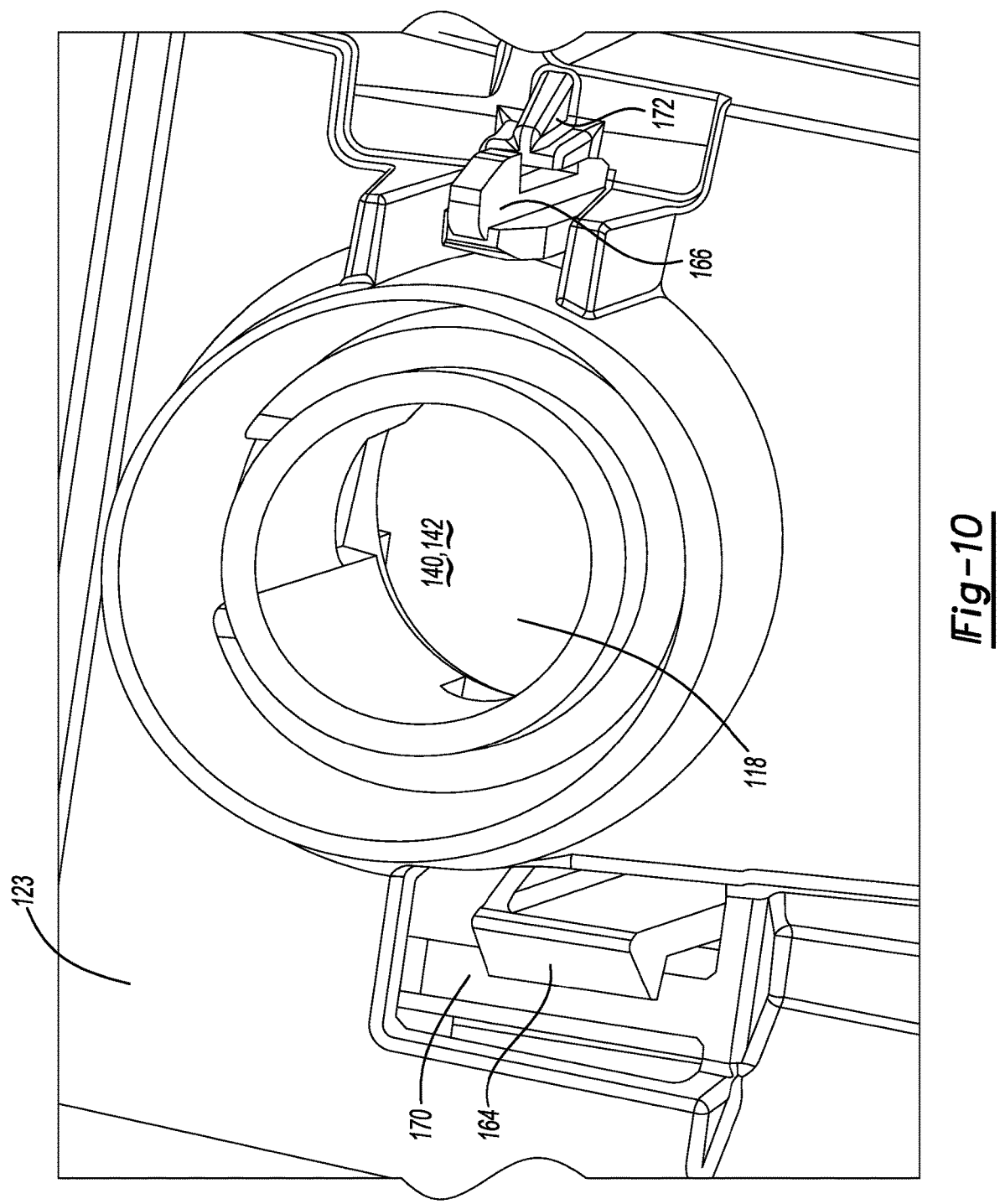
FIG. 10 generally depicts an underside view of the mirror housing of FIG. 9 in accordance to one embodiment.

FIG. 10 generally depicts an underside view of the mirror housing 123 of FIG. 9 in accordance to one embodiment. As noted above, the mirror housing 123 includes the first opening 170 and the second opening 172. The clip 164 of the device 142 may be inserted into the first opening 170 to secure the device 142 to the mirror housing 123. The device 142 further includes a hook and locator mechanism 166 that may be inserted into the second opening 172. In general, the image capture device 116 or the lamp 144 may be inserted into the opening 118 for alignment purposes. The hook and locator mechanism 166 may be rotatable until the clip 164 is seated and secured with the first opening 170.

Figure 11:
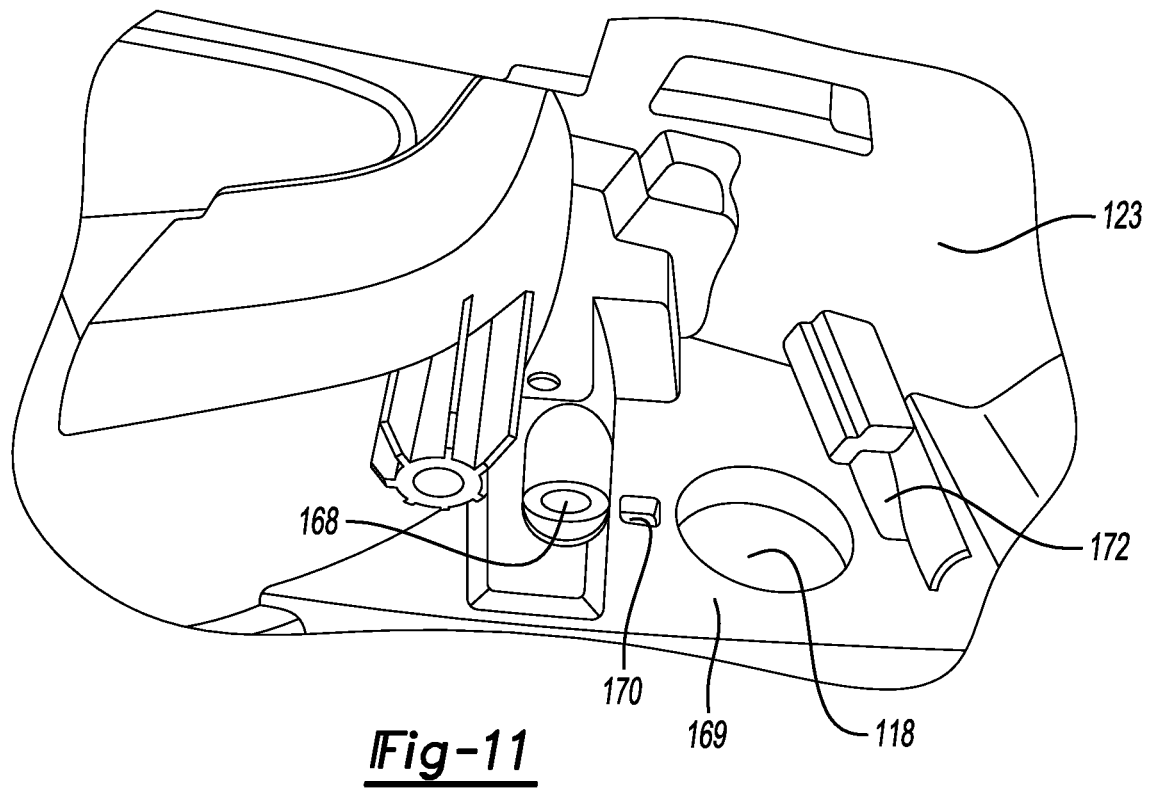
FIG. 11 generally depicts a top view of the mirror housing of FIG. 9.
Figure 12:
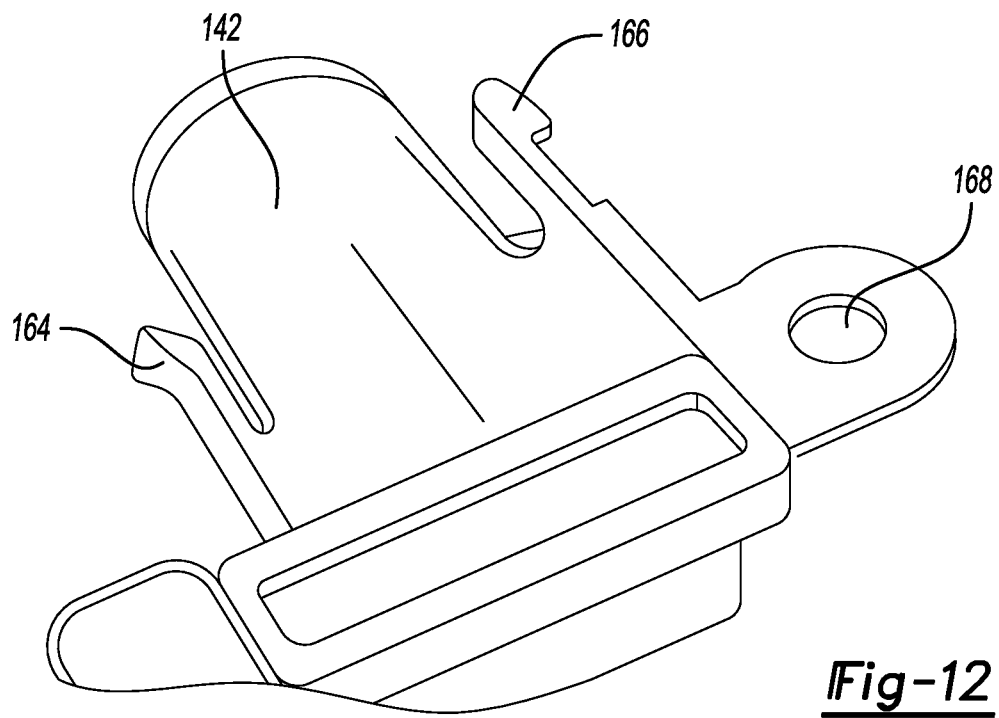
FIG. 12 generally depicts detailed view of clips and a clip locator on a housing bracket for the embodiment illustrated in connection with FIGS. 9-10.

FIG. 11 generally depicts a top view of the mirror housing 123 of FIG. 9. A shown, the first opening 170 and the second opening 172 directly receive the device 142 and thereby secures the device 142 directly to the mirror housing 123. As noted above, this condition obviates the need to couple the device 142 to the finisher 106 which provides for an overall weight reduction for the finisher 106. FIG. 12 provides a more detailed view of the device 142.

Figure 13:
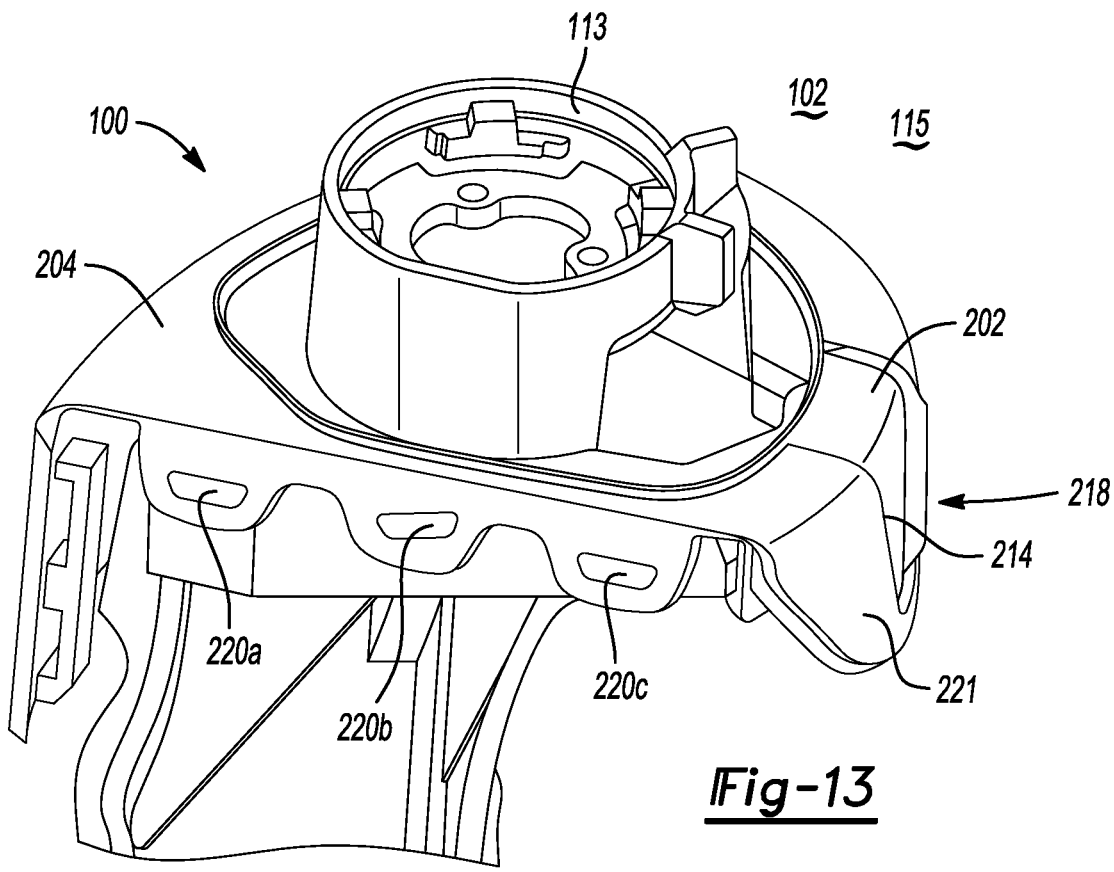
FIG. 13 generally depicts a perspective view of a base bracket, a cutline gasket, and a base cover in accordance to one embodiment.

FIG. 13 generally depicts a perspective view of the base bracket 113, a cutline gasket 202, and a base cover 204 in accordance to one embodiment. While not shown in connection with FIG. 1, the assembly 100 also includes the cutline gasket 202 and the base cover 204. In general, the base cover 104, the finisher 106, the mirror housing 110, and the cap 112 are formed together to form the exterior shell 115 for the assembly 100. The base bracket 113 may be positioned within the exterior shell 115 to support the shell 115 about the vehicle 102. A lower end of the base bracket 113 may be mounted or fixed to a portion of the vehicle 102, such as a door or pillar. The shell 115 is generally configured to pivot or swivel about the base bracket 113.

The cutline gasket 202 may be resilient and is a gasket-like member that serves to provide a seal between the moveable exterior shell 115 and the base bracket 113. The cutline gasket 202 may eliminate wind noise and prevent water or debris intrusion. The cutline gasket 202 may generally be formed of a single resilient material such as, for example, rubber or the like.

Figure 14:
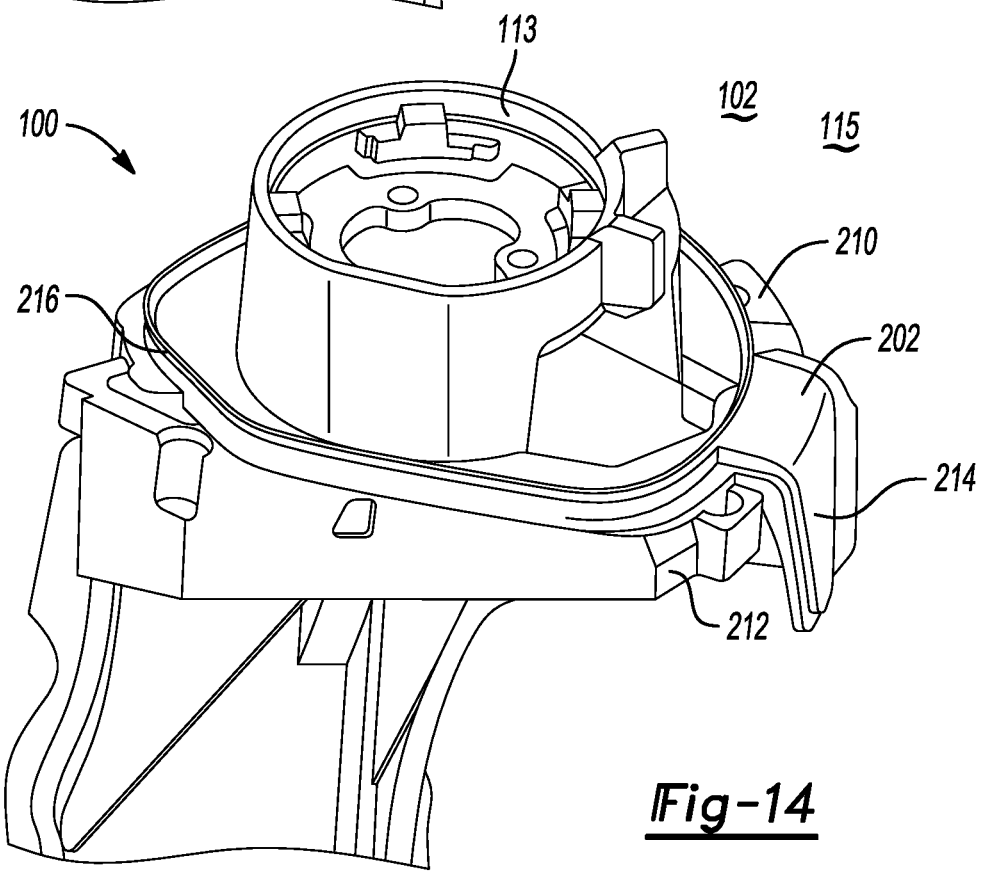
FIG. 14 generally depicts another perspective view of the base bracket and the cutline gasket of FIG. 13.

In general, the embodiment as illustrated in connection with FIG. 13 may control a gap (or cutline gap) 117 (see FIG. 1) that is generally present between the base cover 104 and the finisher 106 (see also FIG. 1). The cutline gasket 202 itself is generally situated within the gap 117 formed between the base cover 104 and the finisher 106. The cutline gasket 202 provides a seal within the gap 117. In prior implementations, the cutline gasket 202 is situated onto the base cover 204 and the base cover 204 is then positioned on the base bracket 113 where the cutline gasket 202 is then sandwiched between the base cover 204 and the base bracket 113. In this case, the gap 117 that is formed between the base cover 104 and the finisher 106 may not be uniform and yield a high degree of variance which may minimize the ability of the cutline gasket 202 to reduce wind noise or prevent water or debris intrusion. In contrast to the prior implementation, FIG. 14 illustrates that the cutline gasket 202 is inserted over the base bracket 113 first. As shown, the base bracket 113 includes an outwardly extending collar 210 to receive the cutline gasket 202.

The cutline gasket 202 may include a flange 214 that drapes over the collar 210 and an outbound flange 212 of the base bracket 113. The flange 214 may assist the user in pulling the cutline gasket 202 over the collar 210 and the outbound flange 212 of the base bracket 113. The cutline gasket 202 seals itself to the base bracket 113. Referring to FIGS. 13 and 14, the base cover 204 is then placed over the cutline gasket 202. The base cover 104 may be formed of, for example, acrylonitrile styrene acrylate or acrylic styrene acrylonitrile (ASA) or any injectable plastic. The cutline gasket 202 includes an outer collar 216 that receives and directly contacts an underside of the base cover 204. The base cover 204 includes an opening 218 for receiving the flange 214. A lower lip 221 of the base cover 204 extends below the flange 214 to also assist the user in fitting the base cover 204 over the flange 214.

Figure 15:
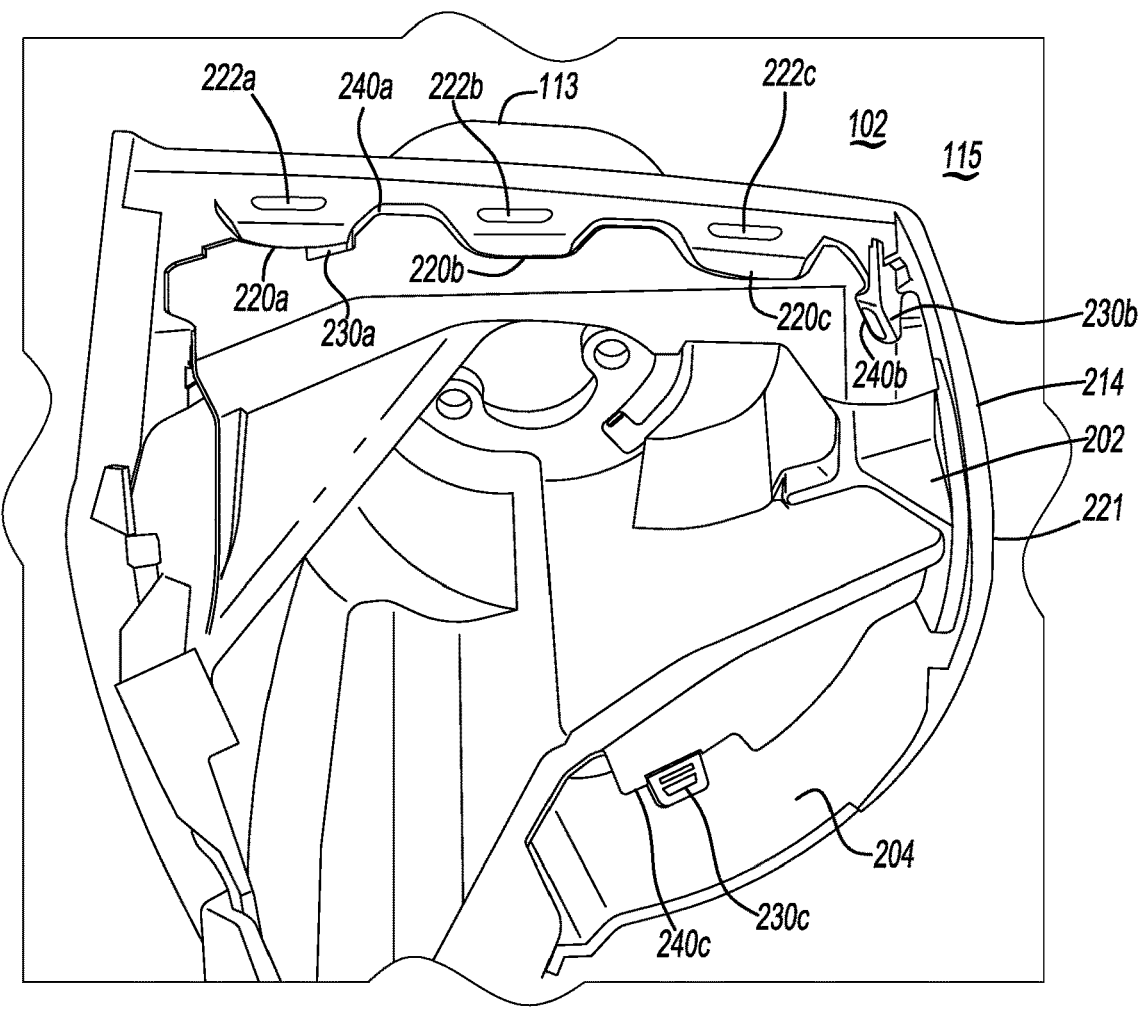
FIG. 15 generally depicts an underside view of the base bracket, the cutline gasket and the base cover of FIG. 13.

Referring to FIGS. 13 and 15, the base bracket 113 includes a plurality of extending portions 220a, 220b, 220c that protrude outwardly from the base bracket 113. The base cover 204 includes a plurality of fitting openings 222a, 222b, 222c that are fitted over the respective extending portions 220a, 220b, 220c to couple the base cover 204 to the base bracket 113. As noted above, since the cutline gasket 202 is fitted to the base bracket 113 first, this aspect controls the overall variation in the gap 117 which improves the overall sealing effect of the cutline gasket 202 and further provides a uniform opening (i.e., of the gap 117) which improves the overall fit and appearance of the assembly 100.

Figure 16:
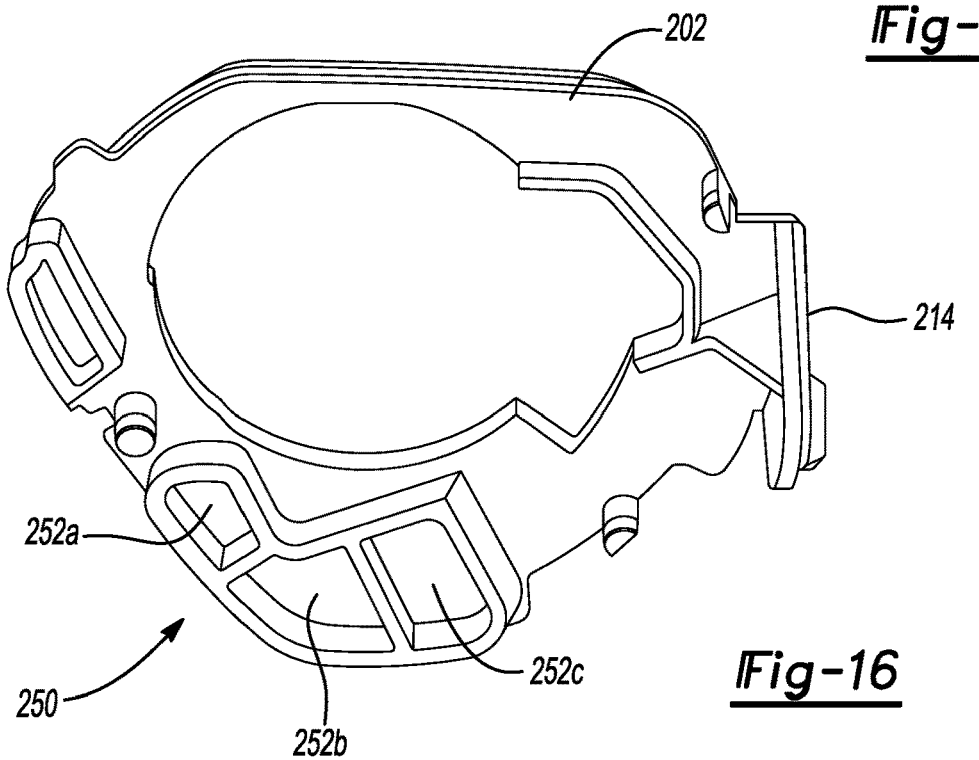
FIG. 16 generally depicts a detailed view of the cutline gasket of FIG. 13.

FIG. 15 depicts an underside of the base bracket 113, the flange 214 of the cutline gasket 202 and the base cover 204. As shown, the base cover 204 further includes flexible hooking portions 230a, 230b, 230c that engage respective portions of a lower lip 240a, 240b, 240c of the base bracket 113. These features also aid in coupling the base cover 204 to the base bracket 113. FIG. 16 provide an underside view of the cutline gasket 202 in accordance to one embodiment. The cutline gasket 202 further includes a retaining portion 250 positioned on an underside thereof. The retaining portion 250 includes receiving sections 252a, 252b, 252c to receive an engagement portion (not shown) of the base bracket 113.

Figure 17:
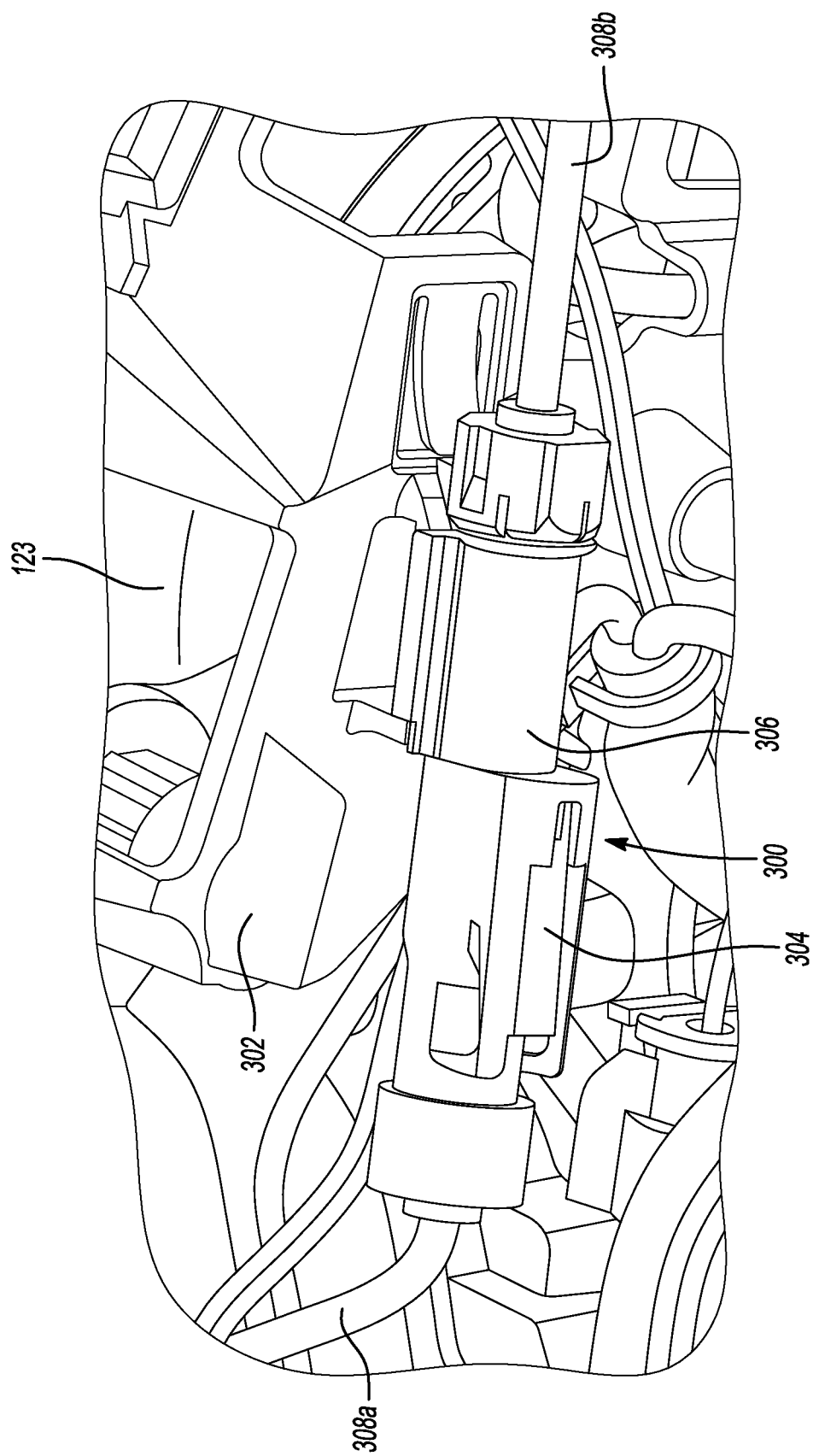
FIG. 17 generally depicts a perspective view of an electrical connector being coupled to a clip that is located on the mirror housing in accordance to one embodiment.

FIG. 17 generally depicts a perspective view of an electrical connector assembly 300 being coupled to a clip 302 that is located on the mirror housing 123 in accordance to one embodiment. In general, the connector assembly 300 may include a first connector 304 and a second connector 306 that are used to couple wires (or wire harnesses) 308a, 308b that are routed within the assembly 100. In one example, the wires 308a, 308b may correspond to a coaxial wire that is used for transmitting signals to the image capture device 116. The assembly 100 generally includes pigtail (e.g. which could be wire 308) that is directly attached to the image capture device 116. Upon installation of the assembly 100, it is necessary to connect the wire 308b to the wire 308a so that one or more controllers positioned in the vehicle can communicate with the image capture device 116 in the assembly 100. Prior implementations do not provide a clip to fix the first and second connectors 304, 306, respectively. This may lead to a rattling noise within the assembly 100 that can be heard by vehicle passengers.

Figure 18:
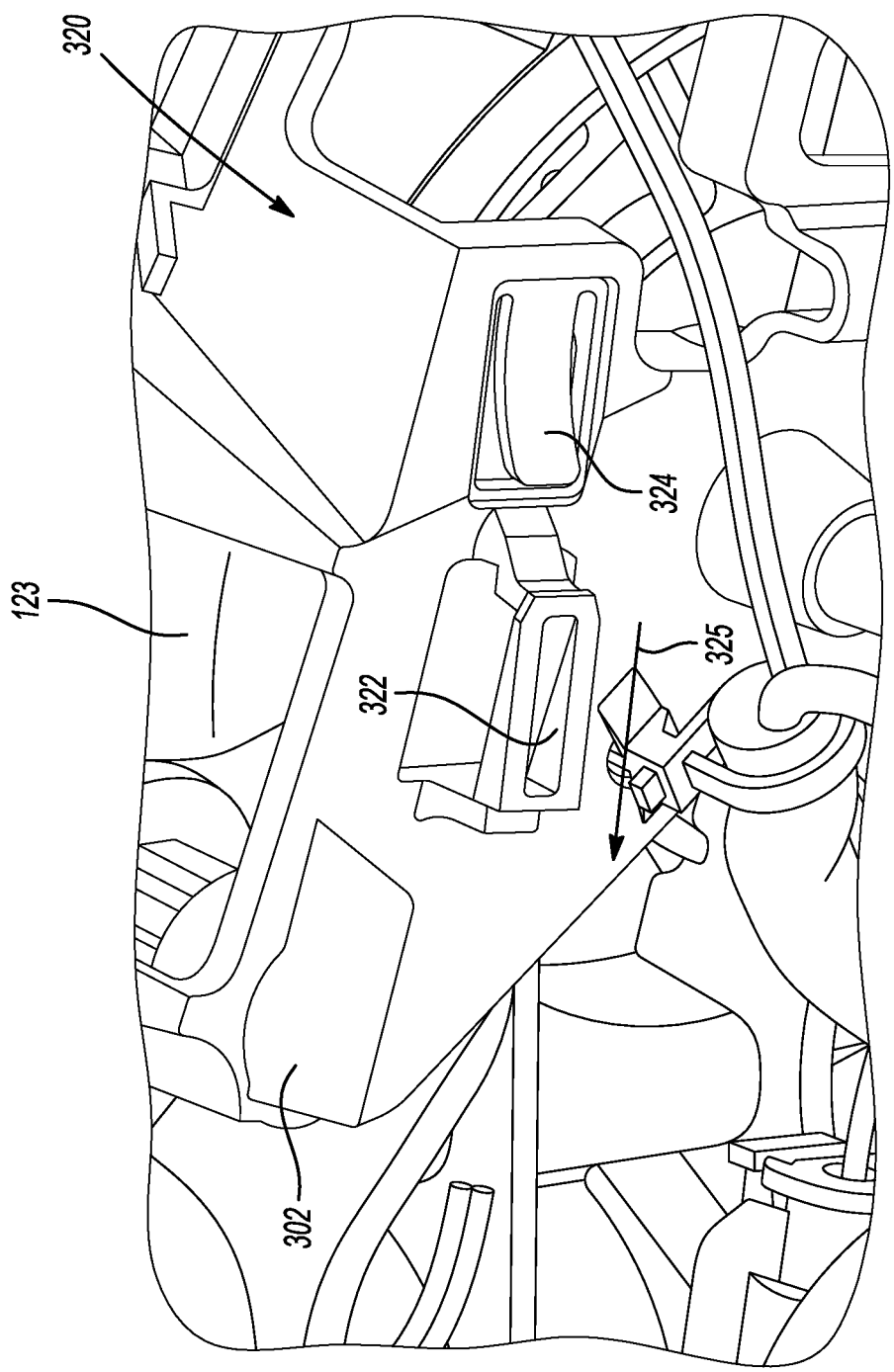
FIG. 18 generally depicts a perspective view of the clip of FIG. 17.
Figure 19:
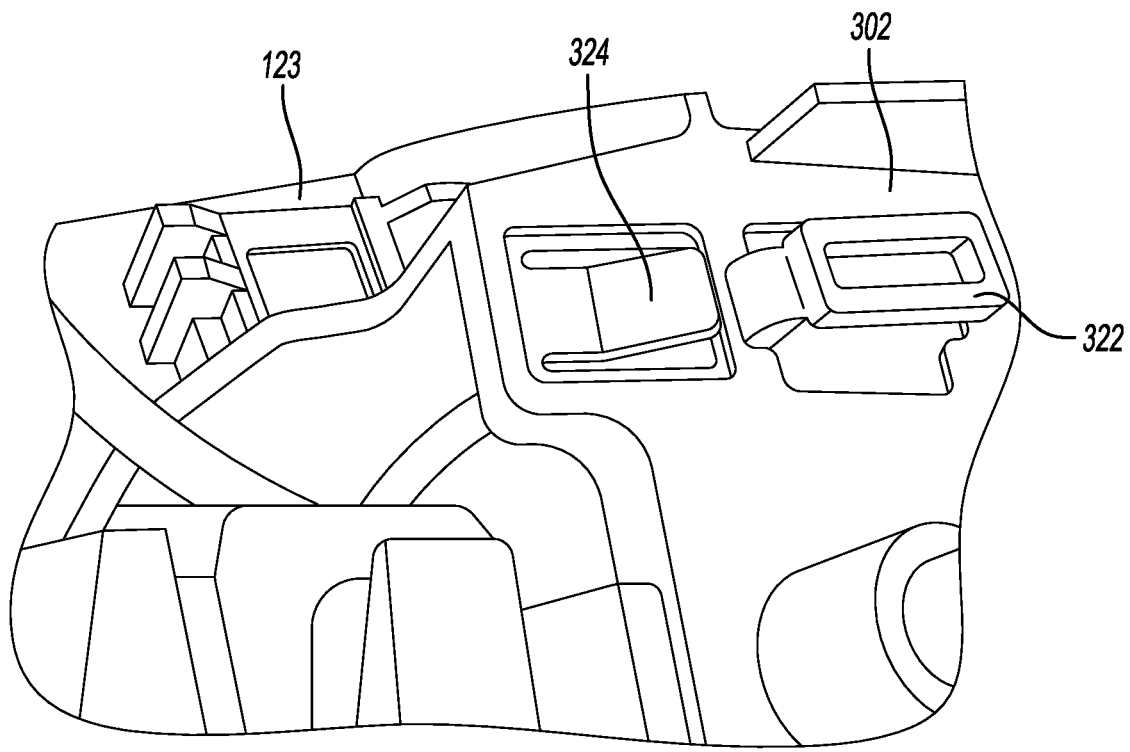
FIG. 19 generally depicts another perspective view of the clip on the mirror housing of FIG. 17.
Figure 20:
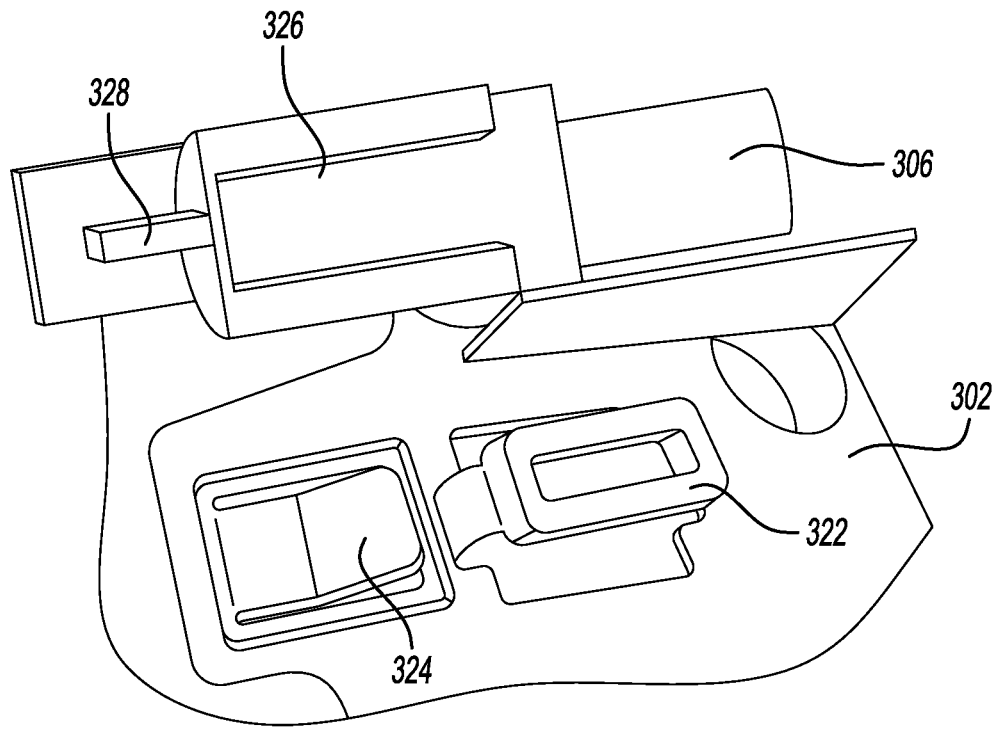
FIG. 20 generally depicts a detailed view of the clip of FIG. 17.
Figure 21:
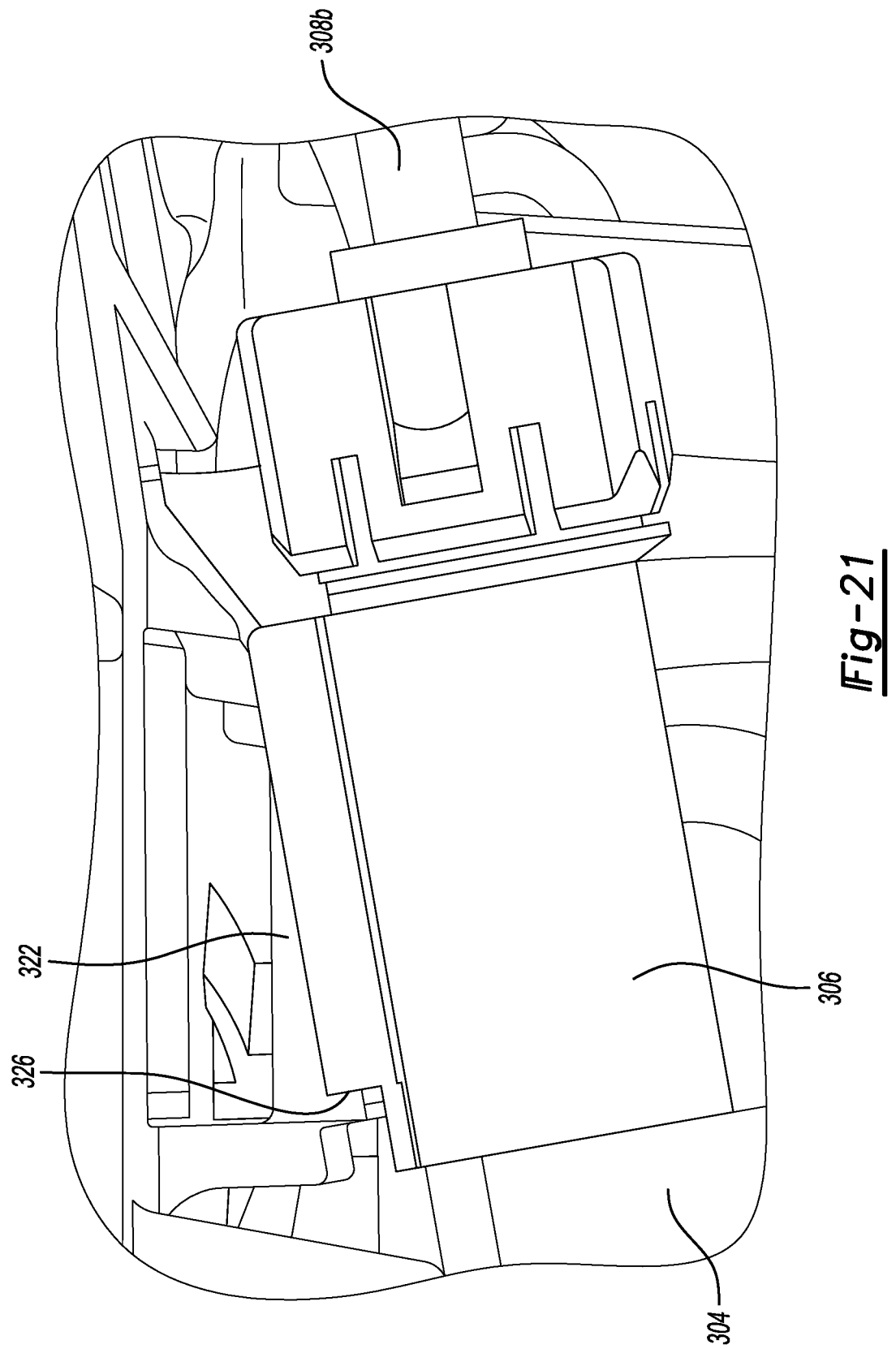
FIG. 21 generally depicts another perspective view of the electrical connector and the clip on the mirror housing of FIG. 17.

FIGS. 18 and 19 generally depict a perspective view of the clip 302 of FIG. 17. The clip 302 may be integrally formed with the mirror housing 123. Alternatively, the clip 302 may be removably coupled to the mirror housing 123. The clip 302 includes a standoff portion 320 to raise the attachment point of the first and the second connectors 304, 306 away from contact with the mirror housing 123. The clip further includes a receiving alignment tab 322 and a flexible locking arm 324. The second connector 306 includes a receiving channel 326 (see FIG. 20) that is inserted into the receiving alignment tab 322 along an axis 325 (see FIG. 18). Upon insertion of the second connector 306 onto the clip 302, a mating clip portion 328 (see FIGS. 18 and 20) positioned on the second connector 306 forces the flexible locking arm 324 to move or deflect upon initial contact. The mating clip portion 328 travels along the axis 325 until a back portion of the mating clip portion 328 passes a front portion of the flexible locking arm 324. From there, the flexible locking arm 324 no longer experiences a force from the mating clip portion 328 and raises behind the mating clip portion 328 to lock the second connector 306 onto the clip 302. Once the second connector 306 is fixed to the clip 302, a user may then attach the first connector 304 to the second connector 306 such that the connector assembly 300 is fixed within the assembly 100.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An exterior rearview winglet assembly for a vehicle comprising:
   an exterior shell including a first side oriented toward a front of the vehicle and a second side oriented toward a rear of the vehicle;
   a base bracket positioned in the exterior shell to couple the exterior shell to the vehicle;
   a first housing positioned in the exterior shell;
   a finisher being attached to the first housing and extending from at least a portion of the exterior shell at the second side of the exterior shell; and
   a first electrical device being directly attached to the first housing and the first electrical device being independent of attachment to the finisher,
   wherein the finisher defines a first opening to surround the first electrical device, and
   wherein the first housing includes a flexible latch, and wherein the first electrical device includes a rear portion, a clip, and a hook and locator mechanism for attachment to the first housing.

2. The exterior rearview winglet assembly of claim 1, further comprising a second electrical device being directly attached to the first housing and the second electrical device being independent of attachment to the finisher to reduce an overall weight of the finisher, wherein the finisher defines a second opening to receive the second electrical device.

3. The exterior rearview winglet assembly of claim 1, wherein the first electrical device is one of an image capture device, a lamp, an antenna, a communication module, and a sensor.

4. The exterior rearview winglet assembly of claim 1, wherein the clip and the hook and locator mechanism are positioned on opposite sides of one another on the first electrical device to provide attachment and alignment to the first housing.

5. The exterior rearview winglet assembly of claim 1, wherein the rear portion of the first electrical device applies a force against an underside of the flexible latch.

6. The exterior rearview winglet assembly of claim 5, wherein the clip and the hook and locator mechanism are received by respective openings formed in the first housing as the rear portion of the first electrical device applies a force against the underside of the flexible latch.

7. The exterior rearview winglet assembly of claim 6, wherein the flexible latch applies a clamping force against the rear portion of the first electrical device in response to the clip and the hook and locator mechanism being received and attached to the first housing.

8. The exterior rearview winglet assembly of claim 1, wherein the first housing is a mirror housing to support a reflective surface or an image capture device on the exterior shell.

9. The exterior rearview winglet assembly of claim 1, wherein the first electrical device is further configured to be directly attached to the first housing, and wherein the first opening is recessed to surround the first electrical device.

10. The assembly of claim 1, wherein the first electrical device is unattached to the finisher while positioned within the first opening to reduce an overall weight of the finisher.

11. An exterior rearview winglet assembly for a vehicle comprising:
   an exterior shell including a first side oriented toward a front of the vehicle and a second side oriented toward a rear of the vehicle;
   a base bracket to couple the exterior shell to the vehicle;
   a first housing positioned in the exterior shell;
   a finisher being attached to the first housing and extending from at least a portion of the exterior shell at the second side of the exterior shell; and
   a first electrical device being directly attached to the first housing and the first electrical device being independent of attachment to the finisher to reduce an overall weight of the finisher,
   wherein the finisher defines a first opening to surround the first electrical device, and
   wherein the first housing includes a flexible latch, and wherein the first electrical device includes a rear portion, a clip, and a hook and locator mechanism for attachment to the first housing.

12. The exterior rearview winglet assembly of claim 11, wherein the clip and the hook and locator mechanism are positioned on opposite sides of one another on the first electrical device to provide attachment and alignment to the first housing.

13. The exterior rearview winglet assembly of claim 11, wherein the rear portion of the first electrical device applies a force against an underside of the flexible latch.

14. The exterior rearview winglet assembly of claim 13, wherein the clip and the hook and locator mechanism are received by respective openings formed in the first housing as the rear portion of the first electrical device applies a force against the underside of the flexible latch.

15. The exterior rearview winglet assembly of claim 11, wherein the first electrical device is further configured to be directly attached to the first housing, and wherein the first opening is recessed to surround the first electrical device.

16. The assembly of claim 11, wherein the first opening and the first electrical device are oriented to face an exterior ground floor that surrounds the vehicle relative to a horizontal plane.

17. An exterior rearview winglet assembly for a vehicle comprising:
   an exterior shell including a first side oriented toward a front of the vehicle and a second side oriented toward a rear of the vehicle;
   a base bracket to couple the exterior shell to the vehicle;
   a first housing positioned in the exterior shell and being coupled to a housing bracket;
   a finisher being attached to the first housing and extending from at least a portion of the exterior shell at the second side of the exterior shell; and
   a first electrical device being directly attached to the first housing or the housing bracket and the first electrical device being independent of attachment to the finisher to prevent the finisher from decoupling from the exterior shell,
   wherein the finisher defines a first opening to surround the first electrical device,
   wherein the first opening and the first electrical device are oriented to face an exterior ground floor that surrounds the vehicle relative to a horizontal plane.

18. An exterior rearview winglet assembly for a vehicle comprising:
   an exterior shell including a first side oriented toward a front of the vehicle and a second side oriented toward a rear of the vehicle;
   a base bracket positioned in the exterior shell to couple the exterior shell to the vehicle;
   a first housing positioned in the exterior shell;
   a finisher being attached to the first housing and extending from at least a portion of the exterior shell at the second side of the exterior shell; and
   a first electrical device being directly attached to the first housing and the first electrical device being independent of attachment to the finisher,
   wherein the finisher defines a first opening to surround the first electrical device, and
   wherein the first electrical device is unattached to the finisher while positioned within the first opening to reduce an overall weight of the finisher.

19. An exterior rearview winglet assembly for a vehicle comprising:
   an exterior shell including a first side oriented toward a front of the vehicle and a second side oriented toward a rear of the vehicle;
   a base bracket to couple the exterior shell to the vehicle;
   a first housing positioned in the exterior shell;
   a finisher being attached to the first housing and extending from at least a portion of the exterior shell at the second side of the exterior shell; and
   a first electrical device being directly attached to the first housing and the first electrical device being independent of attachment to the finisher to reduce an overall weight of the finisher,
   wherein the finisher defines a first opening to surround the first electrical device, and
   wherein the first opening and the first electrical device are oriented to face an exterior ground floor that surrounds the vehicle relative to a horizontal plane.

\* \* \* \* \*